(12) United States Patent
Stern et al.

(10) Patent No.: US 7,600,183 B2
(45) Date of Patent: Oct. 6, 2009

(54) SYSTEM AND METHOD FOR DATA PUBLICATION THROUGH WEB PAGES

(75) Inventors: Yonatan P. Stern, Hod Hasharon (IL); Emil Shteinvil, Kfar Saba (IL)

(73) Assignee: Olive Software Inc., Aurora, CO (US)

( * ) Notice: Subject to any disclaimer, the term of this patent is extended or adjusted under 35 U.S.C. 154(b) by 125 days.

(21) Appl. No.: 10/449,059

(22) Filed: Jun. 2, 2003

(65) Prior Publication Data

US 2003/0200507 A1 Oct. 23, 2003

Related U.S. Application Data

(63) Continuation-in-part of application No. 09/714,207, filed on Nov. 17, 2000, now Pat. No. 7,418,653.

(60) Provisional application No. 60/211,976, filed on Jun. 16, 2000.

(51) Int. Cl.
*G06F 17/00* (2006.01)
*G06K 9/34* (2006.01)

(52) U.S. Cl. .............. 715/243; 715/205; 715/234; 715/249; 382/171; 382/175; 382/232

(58) Field of Classification Search .......... 715/513, 715/522, 501.1, 523, 526, 200, 201, 202, 715/204, 205, 234, 238, 239, 242, 243, 251, 715/255, 256, 730, 760; 709/217; 707/1, 707/100, 101, 104.1, E17.013, E17.026, E17.027, 707/E17.051; 382/162, 164, 166, 171, 173, 382/175, 232, 233
See application file for complete search history.

(56) References Cited

U.S. PATENT DOCUMENTS 5,742,815 A * 4/1998 Stern .................. 707/103 R (Continued)

FOREIGN PATENT DOCUMENTS

| EP | 1484697 | | 12/2004 |
|----|---------|---|---------|
| WO | WO 99/50763 | * | 10/1999 |
| WO | WO 01/13287 | * | 2/2001 |
| WO | WO 01/98948 | | 12/2001 |

OTHER PUBLICATIONS

FrontPage 2000 by Matthews et al. Published by Osborne/McGraw-Hill 1999 USA (hereinafter Matthews FrontPage 2000) pp. 214-237.*

D. Taubman, "High Performance Scalable Image Compression with EBCOT", IEEE Transactions on Image Processing, vol. 9, No. 7, Jul. 2000, pp. 1158-1170.*

(Continued)

*Primary Examiner*—Laurie Ries
*Assistant Examiner*—Maikhanh Nguyen

(57) ABSTRACT

A system and a method for publishing a newspaper page or other data through a Web page, to make it available more easily through a network such as the Internet. The data is automatically converted by first rendering the newspaper page into a digital format; the converting the digital format to a basic internal publishing format; and then publishing the data in a number of different possible publishing formats, including a mark-up language document such as a Web page. Features include arrangement of content according to relationships within the information by analyzing the page as distinct objects. Object types include titles, articles, pictures etc. Objects may be categorized, and objects in each category are preferably compressed according to a different image format.

8 Claims, 12 Drawing Sheets

U.S. PATENT DOCUMENTS

| | | | |
|---|---|---|---|
| 5,867,112 A * | 2/1999 | Kost | 341/51 |
| 5,893,127 A | 4/1999 | Tyan et al. | |
| 5,907,837 A * | 5/1999 | Ferrel et al. | 715/517 |
| 5,953,733 A * | 9/1999 | Langford-Wilson | 715/517 |
| 5,963,966 A * | 10/1999 | Mitchell et al. | 715/513 |
| 5,991,515 A * | 11/1999 | Fall et al. | 358/1.15 |
| 6,023,714 A | 2/2000 | Hill et al. | |
| 6,088,708 A | 7/2000 | Burch et al. | |
| 6,161,107 A * | 12/2000 | Stern | 707/104.1 |
| 6,185,589 B1 | 2/2001 | Votipka | |
| 6,199,082 B1 * | 3/2001 | Ferrel et al. | 715/522 |
| 6,230,173 B1 * | 5/2001 | Ferrel et al. | 715/513 |
| 6,233,592 B1 * | 5/2001 | Schnelle et al. | 715/513 |
| 6,313,854 B1 | 11/2001 | Gibson | |
| 6,324,554 B1 | 11/2001 | Watanabe et al. | |
| 6,330,574 B1 * | 12/2001 | Murashita | 715/236 |
| 6,336,124 B1 * | 1/2002 | Alam et al. | 715/523 |
| 6,377,704 B1 | 4/2002 | Cooperman | |
| 6,507,856 B1 | 1/2003 | Chen et al. | |
| 6,587,583 B1 * | 7/2003 | Kurzweil et al. | 382/239 |
| 6,691,281 B1 | 2/2004 | Sorge et al. | |
| 6,708,189 B1 | 3/2004 | Fitzsimons et al. | |
| 6,708,309 B1 * | 3/2004 | Blumberg | 715/530 |
| 6,731,814 B2 * | 5/2004 | Zeck et al. | 382/239 |
| 6,938,051 B1 * | 8/2005 | Burger et al. | 707/104.1 |
| 6,992,782 B1 * | 1/2006 | Yardumian et al. | 358/1.13 |
| 7,145,676 B2 * | 12/2006 | Fan | 358/1.15 |
| 7,167,270 B2 * | 1/2007 | Silverbrook et al. | 358/1.18 |
| 2001/0042078 A1 * | 11/2001 | Anwar | 707/500 |
| 2002/0029232 A1 | 3/2002 | Bobrow et al. | |
| 2003/0140315 A1 | 7/2003 | Blumberg et al. | |
| 2003/0220905 A1 * | 11/2003 | Amado et al. | 707/1 |
| 2005/0046901 A1 * | 3/2005 | Silverbrook et al. | 358/1.18 |
| 2005/0055420 A1 * | 3/2005 | Wyler | 709/217 |
| 2005/0144256 A1 * | 6/2005 | Blumberg | 709/217 |

OTHER PUBLICATIONS

Said et al., "A New, Fast, and Efficient Image Codec Based on Set Partitioning in Hierarchical Trees", IEEE Transactions on Circuits and Systems for Video Technology, vol. 6, No. 3, Jun. 1996, pp. 243-250.*

Crouse et al, "Joint Thresholding and Quantizer Selection for Transform Image Coding: Entropy-Contrained Analysis and Applications to Baseline JPEG", IEEE Transactions on Image Processing, vol. 6, No. 2, Feb. 1997, pp. 285-297.*

Altamura "Wisdom++: An Interactive and Adaptive Document Analysis System", ICDAR '99: 366-369, 1999. Section 1. Abstract.

Dail "ActivePaper XML Structure in Brief", Internet Article 'Online! Retrieved From the Internet: URL: http://www.1fnet.it/oclc/olive/olive_ActivePaper_XML_structure.doc>, 2002.

Hong et al. "Representing OCRed Documents in HTML", ICDAR II: 831-834, 1997, Section 2. Abstract.

Kopec "Document Image Decoding in the Berkeley Digital Library", Proceedings of the International Conference on Image Processing, 1(2): 769-772, 1996. Abstract.

Rogers et al. "The ISL Document Image Analysis Toolbox", DIA '97: 18-25, 1997. Sections 2.1, 3.1, 4.1-4.5, 5. Abstract.

Worring et al. "From Linear to Non-Linear Reading: A Case Study to Provide Internet Access to Paper Documents", ICDAR, II: 273-277, 1997. Sections 2, 3, 5, 6.

* cited by examiner

Figure 2 (cont1)
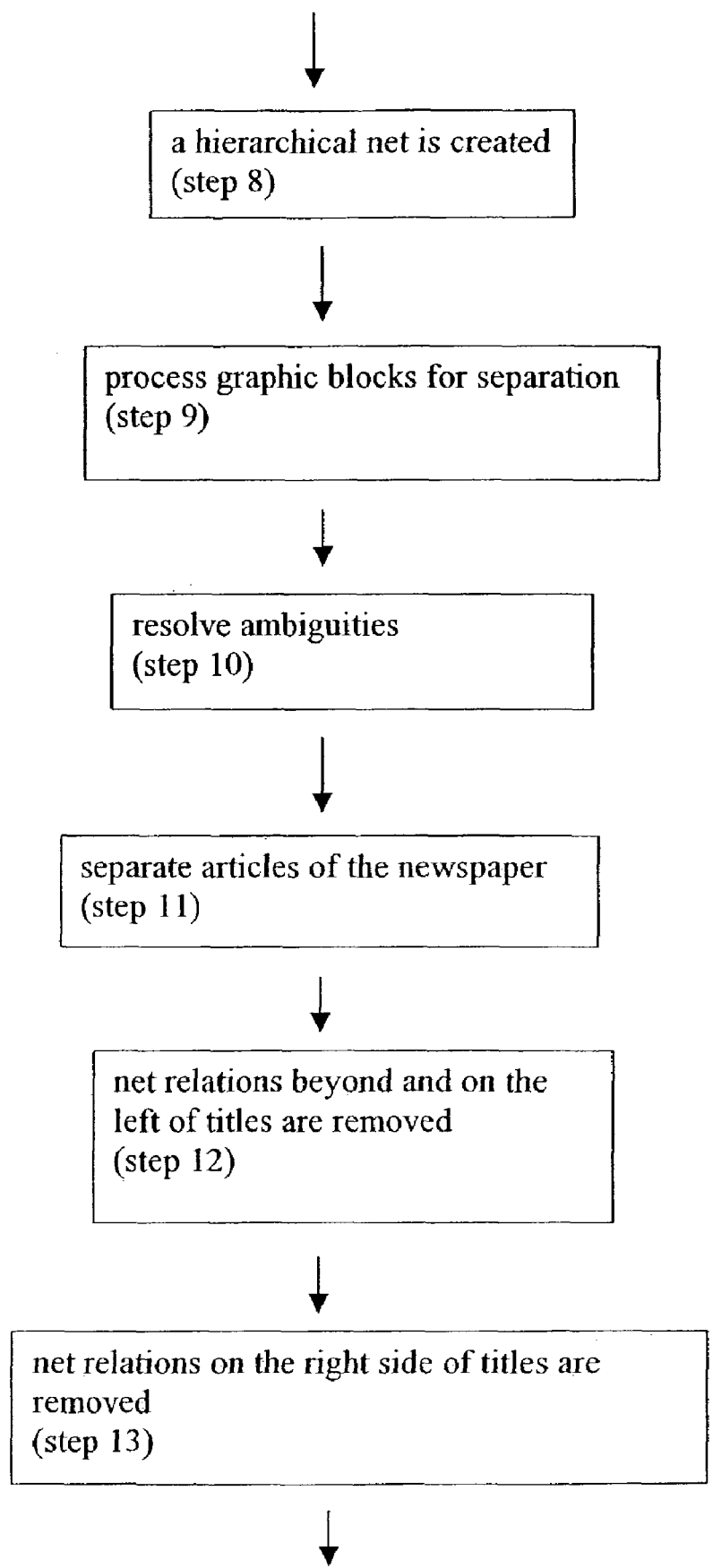

Figure 2 (cont2)
```
recognize various types of
specific units of data
(step 14)
```
```
entities are created from areas
(step 15)
```
```
resolve additional ambiguities
(step 16)
```

Fig. 5A

Convert digital document to interconvertible format (stage 1)

↓

Select page resolution (stage 2)

↓

Use Application Programming interface is used to separate images, vector graphic and texts into different bitmap images (stage 3)

↓

Use different compression formats to at least convert the different bitmap layers (stage 4)

↓

Choose suitable optimisation parameters for each layer (stage 5)

Fig. 7C

SYSTEM AND METHOD FOR DATA PUBLICATION THROUGH WEB PAGES

This Application is a Continuation-in-Part Application of U.S. patent application Ser. No. 09/714,207, filed on 17 Nov. 2000, now U.S. Pat. No. 7,418,653 and also claims priority from U.S. Provisional Application No. 60/211,976, filed on 16 Jun. 2000, both of which are hereby incorporated by reference as if fully set forth herein.

FIELD OF THE INVENTION

The present invention relates to a system and a method for the publication of data through Web pages, and in particular, for such a system and method in which data is automatically converted to a format which is suitable for direct publication as a Web page.

BACKGROUND OF THE INVENTION

As the Internet grows, many different types of Web sites are becoming connected and therefore are available to users. A Web site refers to a type of graphical document presentation which is available through the "World Wide Web", or simply "Web", which may also be viewed as a subset of the content which is generally available through the Internet. These Web sites may contain information which is of interest to users, such as news for example. Indeed, many Internet users today obtain at least a portion of their news information from Web sites which publish such information.

Traditional newspapers and other sources of news have therefore been forced to embrace the new media which is represented by Web pages. Currently, many traditional (print) newspapers have Web sites which contain at least a portion of the news and information which is available through the print version of the newspaper. However, managing such Web sites can be cumbersome, since currently there is no simple mechanism for converting data which is available as the printed newspaper, into a format which can be directly published through the Web site. Indeed, typically newspaper publishers currently produce content for the Web site by manually reformatting the newspaper data into a format which is suitable for Web pages. Therefore, the content which is available at the Web site tends to be a relatively limited subset of the total content of the newspaper, with a structure which is not necessarily suitable for the Web site, but instead tends to reflect the structure of the printed newspaper. Thus, given the relatively limited nature of the content of the Web site, and the limited interaction with that content which is provided through the Web pages, newspapers have generally been unsuccessful at charging for the content which is available through the Web site. Indeed, the Web site may even compete with the newspaper for paying readers, thus potentially even harming the economic interests of the newspaper.

A more useful solution to this problem would enable the newspaper to more easily and more cost effectively publish news and other information through the Web site, by providing a mechanism for directly publishing the newspaper data in a format suitable for Web pages, thereby reducing the expenses associated with the maintenance of the Web site. In addition, this solution would also enable the newspapers to publish more news and information through the Web site, in a more elaborate and user-friendly layout format, such that the content of the Web site would be of greater interest to the readers of the newspaper. Such enhanced content could even be suitable for being sold by the newspaper, such that the newspaper could charge for access to the Web site content. Thus, rather than reducing the income of the newspaper, the Web site could even increase the number of paying readers and hence increase the income of the newspaper, for example by enabling international subscribers to receive a subscription to the Web site of the newspaper who would otherwise have difficulty obtaining the printed version.

SUMMARY OF THE INVENTION

There is an unmet need for, and it would be highly useful to have, a system and a method for publishing data through Web pages, such that the data is automatically converted to a format which is suitable for publication as a Web page, preferably through the XML (extensible markup language) markup language, and such that the structure of the published content uses the interactive capabilities of the Web page to their fullest extent.

The present invention is of a system and a method which provides these features for publishing a newspaper page or other data through a Web page, such that the information can be made available more easily through a network such as the Internet. The data is automatically converted to the Web page format by first rendering the newspaper page into a digital format; converting the digital format to a basic internal publishing format; and then publishing the data in any one of a number of different possible publishing formats, including but not limited, a mark-up language document such as a Web page for example. Optionally and preferably, according to the present invention, the newspaper page is viewed as a collection of individual objects, which are organized according to a particular order on the printed newspaper page. Examples of such objects include, but are not limited to, a picture, a story, a headline, advertisements and so forth. With regard to each article, additional examples include, but are not limited to, roof title, abstract, subtitle, lead, caption, continuation, byline and so forth.

According to preferred embodiments of the present invention, the structure of the published content uses the interactive capabilities of the Web page to their fullest extent, by enabling the user to view different portions of the content in any desired order, with links between these portions being made according to the information in the content and/or according to the type of content, rather than according to an arbitrary structure imposed according to the requirements of the printed newspaper. In addition, optionally and preferably, the user is able select different portions of the newspaper content for viewing according to a structure and/or order which is requested by the user, rather than being imposed by the publisher. Thus, for example, the above newspaper objects on the newspaper page are optionally selected and/or rearranged according to the request of the user.

According to the present invention, there is provided a method for automatically publishing data in a final publication format, the method comprising the steps of: (a) analyzing the data to decompose the data into a plurality of objects; (b) converting each object to an internal publication format; and (c) rendering the internal publication format in the final publication format.

According to another embodiment of the present invention, there is provided a system for automatically publishing data in a computerized format, the system comprising: (a) a source of the data in a digital format; (b) a mark-up language distiller module for converting the data in the digital format to a mark-up language format; and (c) a publisher server for converting the data from the mark-up language format to a final publication format.

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof. For any of these implementations, the functional steps performed by the method could be described as a plurality of instructions performed by a data processor.

Hereinafter, the term "Web browser" refers to any software program which can display text, graphics, or both, from Web pages on World Wide Web sites. Hereinafter, the term "Web server" refers to a server capable of transmitting a Web page to the Web browser upon request.

Hereinafter, the term "Web page" refers to any document written in a mark-up language including, but not limited to, HTML (hypertext mark-up language) or VRML (virtual reality modeling language), dynamic HTML, XML (extensible mark-up language) or XSL (XML styling language), or related computer languages thereof, as well as to any collection of such documents reachable through one specific Internet address or at one specific World Wide Web site, or any document obtainable through a particular URL (Uniform Resource Locator). Hereinafter, the term "Web site" refers to at least one Web page, and preferably a plurality of Web pages, virtually connected to form a coherent group.

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

BRIEF DESCRIPTION OF THE DRAWINGS

The invention is herein described, by way of example only, with reference to the accompanying drawings, wherein:

FIGS. 5A and 5B shows flowcharts of exemplary methods according to the present invention for efficiently compressing an image representing a page of a document having both text and one or more images within the page;

FIGS. 7A-7C show an exemplary page of a document after operation of the method according to the present invention.

DESCRIPTION OF THE PREFERRED EMBODIMENTS

Figure 1:
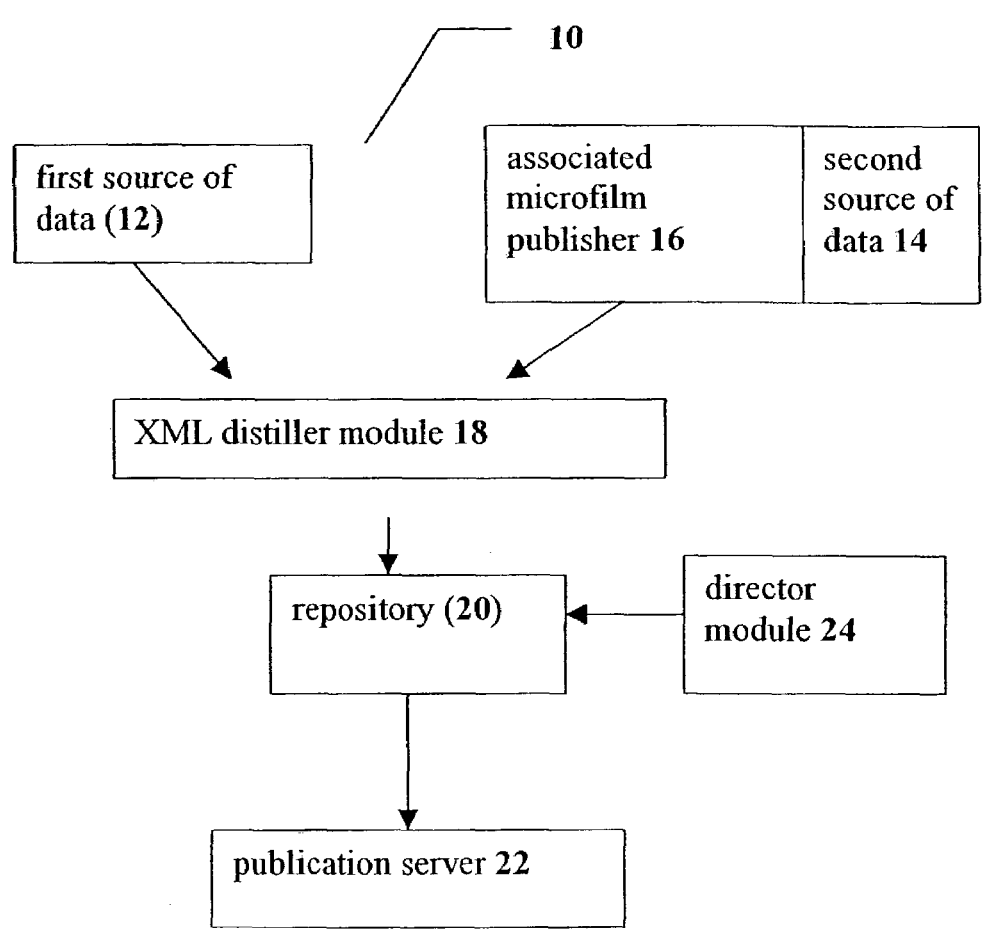
FIG. 1 is a schematic block diagram of an exemplary system according to the present invention.

The present invention is of a system and a method for publishing a newspaper page or other data through a Web page, such that the information can be made available more easily through a network such as the Internet. The data is automatically converted to the Web page format by first rendering the newspaper page into a digital format; converting the digital format to a basic internal publishing format; and then publishing the data in any one of a number of different possible publishing formats, including but not limited to, a mark-up language document such as a Web page for example. However, as described with regard to the preferred embodiments below, the present invention does not merely convert the data from one format to a different format, but instead is able to also provide at least a basic structure for organizing the data into the Web page.

According to preferred embodiments of the present invention, the structure of the published content uses the interactive capabilities of the Web page to their fullest extent, by enabling the user to view different portions of the content in any desired order, with links between these portions being made according to the information in the content and/or according to the type of content, rather than according to an arbitrary structure imposed according to the requirements of the printed newspaper. In addition, optionally and preferably, the user is able select different portions of the newspaper content for viewing according to a structure and/or order which is requested by the user, rather than being imposed by the publisher.

The present invention optionally and preferably realizes these goals by providing a method for automatic recognition of objects on the newspaper page, which are then published to the Web. Therefore, the newspaper page is viewed as a collection of individual objects, which are organized according to a particular order on the printed newspaper page. Examples of such objects include, but are not limited to, a picture, a story, a headline, advertisements and so forth. With regard to each article, additional examples include, but are not limited to, roof title, abstract, subtitle, lead, caption, continuation, byline and so forth. These objects may optionally be rearranged according to any desired order for the Web page, and are preferably not limited only to the order which is required for printing on the printed paper version of the newspaper. Optionally and more preferably, the objects are first classified according to different types, for example according to the type of content, before being organized into the Web page.

According to an optional but preferred embodiment of the present invention, each object or block is preferably categorized into one of a plurality of categories, after which each object in a particular category is preferably converted into an image format, such that preferably objects in each category are converted into a different image format. The categories preferably include at least image and text categories.

The principles and operation of the present invention may be better understood with reference to the drawings and the accompanying description.

Referring now to the drawings, FIG. 1 is a schematic block diagram of a system according to the present invention for automatically publishing data in a Web page format. Although the present invention is explained with regard to publishing newspaper data, it is understood that this is for the purposes of explanation only and is without any intention of being limiting.

As shown, a system 10 optionally and preferably features different sources of data, such as a first source 12 which contains new data, for current publication in the newspaper; and a second source 14 which contains archived data. First source 12 and second source 14 may be typically expected to only contain general information about the text itself and the fonts for printing the text, possibly with information about the reproduction of the text for each line thereof. Such limited information is often available because many "on-line" or Web page publications present newspaper pages in PostScript™ or PDF formats. These formats contain information about each character and each line, but do not contain information about high level objects such as classification of the information by article, title, caption, picture and so forth. Furthermore, most archived data is only available for presentation in image formats like TIFF, for example. These image formats contain only the page image at a high resolution.

One of the advantages of the present invention is that archived data can optionally be easily integrated with current sources of data, such that the newspaper which is published in the Web page format can represent a combination of current and previously published information. Second source 14 is shown as microfilm data, with an optional but preferred associated microfilm publisher 16 according to the present invention, for converting the microfilm data into a digital format, by converting the microfilm data to digital images.

Optionally, the scanned microfilm data is preprocessed in order to clean the data, for example in order to improve image quality, crop the black adages and straighten the images. Preferably, the scanned microfilm format is TIFF, and the digital format data is in the PDF format. Microfilm publisher 16 more preferably performs the following functions. First, microfilm publisher 16 performs optical character recognition (OCR), including recognition of fonts and coordinates for the text. The recognition of text is important for enabling free text searching and indexing of the newspaper data.

Next, microfilm publisher 16 preferably recognizes pictures, photos and other graphic images. Microfilm publisher 16 also preferably recognizes vertical and horizontal lines, frames and background images. The output data is then preferably in the PDF format, or alternatively another suitable type of digital data format.

Data which is in a digital format can then optionally and more preferably be converted to a basic internal format. The basic internal format can then more preferably be converted to a variety of different final formats for publication. Therefore, preferably the digital format data is only converted to a single format before publication in a variety of formats, in order to increase the efficiency of the conversion process.

As shown, the internal format is optionally and preferably XML, although substantially any other type of mark-up language could also be used. The conversion process is preferably performed by an XML distiller module 18.

Next, XML distiller module 18 preferably performs intelligent structure analysis, in order to be able to recognize and define the structures and objects contained in the newspaper data, particularly with regard to each page of the newspaper. Examples of such structures and objects include, but are not limited to, articles, advertisements, titles, and so forth. More preferably, the newspaper objects are classified as one of a plurality of specific entities, which optionally and most preferably are selected from the group consisting of an article, an advertisement, a picture which is not otherwise associated with an article or advertisement, and general data, which covers information that does not fit into one of the preceding categories. Examples of general data include, but are not limited to, crossword puzzles, television guide listings, stock quotes and so forth.

Recognition of the hierarchy for newspaper objects is an important part of the process. One illustrative, non-limiting example of such a hierarchy for recognized newspaper objects is the following: Newspaper->Section->Page->Subsection->Article->Photograph->Caption→Photographer (by name).

The process of intelligent structure analysis enables the newspaper data to be converted to a series of objects, for more efficient search and retrieval through the Internet or other network.

After the process of intelligent structure analysis has been completed, XML distiller module 18 preferably performs XML encoding of the object data. This process results in a set of enhanced, structured files which combine the original image of the data, optionally in the TIF format as previously described, but preferably in the GIF and/or JPG formats, with the text and XML information. Each such file thus preferably maintains the visual aspects of the newspaper layout, while enabling far greater functionality to be available through the Web page version of the newspaper.

According to preferred embodiments of the present invention, XML distiller module 18 optionally and preferably is able to perform a number of additional functions, for greater flexibility in creating the desired Web page structures. For example, XML distiller module 18 is more preferably able to intelligently create a single Web "page" from multiple page files, for example in order to permit a story object which is printed on multiple pages in the printed newspaper version, to be available on a single Web page in the "on-line" version.

Optionally and more preferably, XML distiller module 18 is able to recognize such features of the printed newspaper page as double pages, and the presence of different sections and subsections in the printed newspaper. Such an analysis is most preferably presented to the user through a graphic user interface (GUI) in a visual representation, for example by displaying each entity with a unique color, and displaying each element with a special hatching pattern and title. The user is then most preferably able to manually edit these intelligent analysis results. Also most preferably, XML distiller module 18 is able to learn while the user is performing such a manual editing process, for example in order to be able to classify a newspaper object properly in the future according to the request of the user.

In addition, XML distiller module 18 is optionally and more preferably able to detect and report "suspicious" results of the intelligent analysis. These results may include possibly incorrectly classified newspaper objects, for example. XML distiller module 18 is then more preferably able to provide an interface, such as a GUI, to the user for navigating through these suspicious results.

Once the data is ready in the internal published format, such as XML for example, the data is preferably stored in a repository 20 according to the present invention. Repository 20 is preferably a structured database, which contains the internal format data for publication in a final format.

The basic internal format represents the content of a newspaper repository, such as repository 20 for example. Repository 20 could optionally contain millions of newspapers from many different publishers, derived from formats such as PostScript, PDF, and TIFF. The source files can optionally be produced by electronic pagination systems like Quark XPress™, which can then generate a PostScript™ or PDF file; or alternatively by scanning data from microfilm or paper and then by converting such scanned data to an image file format such as TIFF for example.

The basic information object of repository 20 is preferably the entity. An entity can be an article, a standalone picture, an advertisement, and so forth, as it is the digitized representation of a self-contained piece of printed content. Repository 20 preferably stores these information objects in two different data formats: a suitable Web page and/or document mark-up language format, such as XML for example, and one or more image format types.

The version of the entity which is stored in the mark-up language format, such as XML, preferably contains the actual content of the newspaper object, as well as details of the internal structure and relationship(s) between its various components, more preferably for both the content itself and for the visual layout of the content on the printed newspaper page.

A document mark-up language such as XML is particularly preferred for storing this type of information about the entity, as XML tags such as Byline, Caption, Lead, Roof-title, and so forth may optionally be used, which reflect the high-level information structure of the entity. These elements are more preferably comprised of lower-level elements called primitives, which are the true building-blocks of repository 20. A primitive is a rectangular region of a printed newspaper page, which contains textual and/or graphical information. Articles and other entities on the printed newspaper page are optionally and preferably represented as a "puzzle", or structured collection, of the rectangular primitives from which the printed page is composed. Child elements of articles, like tables or pictures, can also optionally be composed of one or more such primitives.

Primitives preferably comprise lines, words, and quads (which together form broken or multiple-style words). Each word XML tag then optionally and preferably contains attributes such as page coordinates and font information (supplied as Font Style Gallery references). Storing the original position and style of each element in the original document, such as printed newspaper page for example, supports a rich set of applications that can optionally mimic the design of the printed edition. The ability to optionally imitate the format and design of the printed newspaper edition is especially important for publishing magazines on the Internet and other types of documents for which a strong visual appearance is important. Such ability is also potentially advantageous for printed newspapers which wish to extend the appeal of their printed editions (current and historic) to the web.

The meta-data tag for the XML format version of each entity preferably collects knowledge about the environment of the entity, such as information related to the section of the newspaper to which the entity belongs, the page on which the entity is located, the size of the entity, and the article(s) to which the entity is related. However, meta-data more preferably does not include any actual content, but only a description of the entity information or attributes surrounding the content.

The global Font Style Gallery is a preferred feature of the present invention, which contains descriptions of all the font styles (comprised of font types, sizes and colors) in the newspaper issue. The Style Gallery is more preferably shared by all entities, and is most preferably represented as an external unit in the XML format data for each newspaper issue. The Style Gallery is, however, optionally and most preferably unique for each newspaper issue, thus supporting the dynamic nature of the newspaper's design.

The XML format data in repository 20 is preferably complemented by images, which are snapshots of the original, printed representation of each information object. Repository 20 optionally and more preferably contains a set of images representing the entire newspaper issue, piece by piece, in different resolutions and formats. These images are a powerful tool when combined with the XML format data for each entity, which details each the role and position of each entity on the original printed newspaper page.

Repository 20 preferably stores content both as XML and as images, as previously described, thereby allowing dual presentation. Dual presentation is particularly important and preferred for the construction of archive applications from scanned images. For these archives, the XML format data alone may optionally be insufficient to present the document for high quality display and reading. Such relatively low quality may be caused by the relatively low level of the original font and style recognition, and to error rate caused by the OCR (optical character recognition) process, which may be as high as 10-20% of all characters or even higher. Therefore, in cases where post-OCR scanned images are used as a source of data, images play a very important role, serving as a content holder and enabling the presentation of the original style.

Optionally and more preferably, the internal format data is published in a plurality of different final formats by publication server 22. These different formats may optionally include, but are not limited to, any one or more of a mark-up language document such as a document in XML or HTML for example; a wireless-enabled document such as a WML document for example; the ASCII text format; and a format which is suitable for publication through a technology such as Web TV for example.

More preferably, these different final formats are at least partially determined according to the different types of hardware devices which are available for presenting the published data to the viewing user. Examples of such hardware devices include, but are not limited to, media and/or display devices such as Web TV, Pocket PC and WAP-enabled devices such as cellular telephones for example. Therefore, preferably the digital format data is only converted to a single format before publication in a variety of formats, in order to increase the efficiency of the conversion process.

According to preferred embodiments of the present invention, publication server 22 is optionally and preferably able to perform "on the fly" conversions of the basic internal format, and/or the XML data format, into one or more final formats. Such rapid, real-time or "on the fly" conversions provides support for responses to dynamic queries from different terminal devices to repository 20. In addition, new kinds of supported hardware devices and/or terminal types can optionally easily be performed without changes to repository 20.

For these preferred embodiments of the present invention, publication server 22 preferably features automatic detection of the type of hardware device which has submitted the query. Publication server 22 then preferably performs dynamic (XSL based conversions) of pages, entities and elements according to the source of the query. In addition, publication server 22 also preferably supports textual and meta-data search support according to the XML structure of the entity, as previously described. Publication server 22 can then also optionally offer dynamic presentation of search results in XML format, and the dynamic addition of hit elements to XML entities which are discovered, for emphasizing searched words and phrases inside the text of the entity.

Optionally and more preferably, a director module 24 is able to manipulate the content of the data which is stored in repository 20, for example by editing the data. In addition, director module 24 is preferably able to define style sheets and other layout information for the different formats which are published through publication server 22. Thus, director module 24 most preferably enables the internal format data to be adjusted automatically for publication in each final publication format, in order to most advantageously display the data in each type of format.

Figure 2:
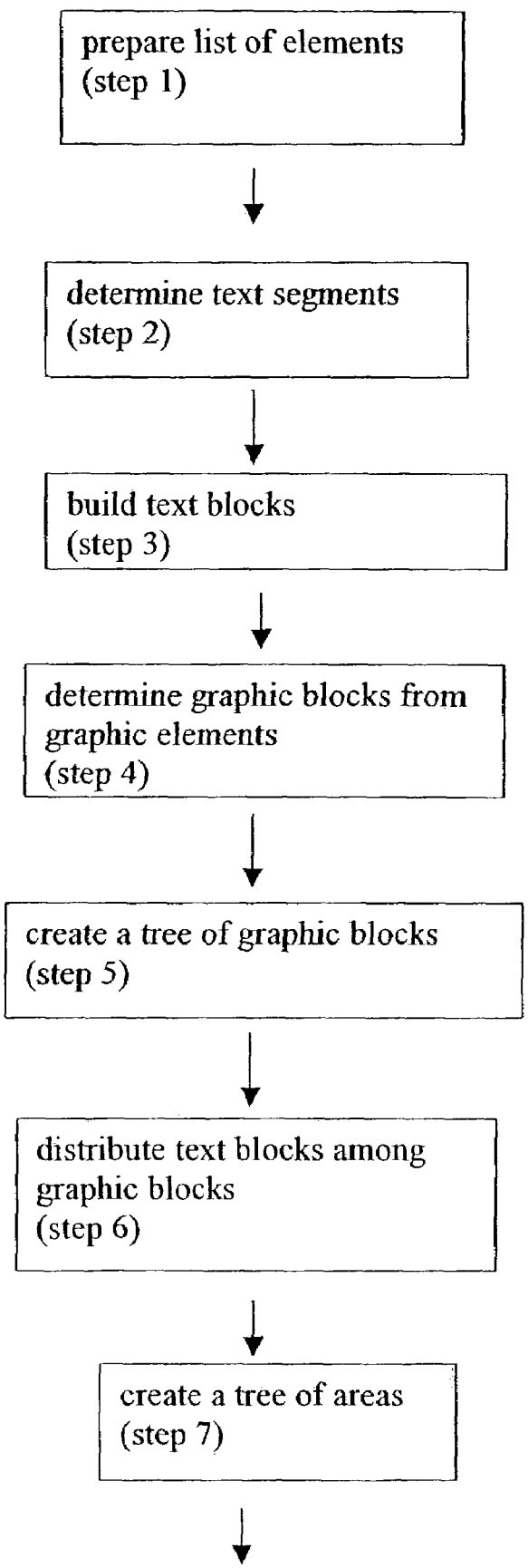
FIG. 2 is a flowchart of an illustrative method according to the present invention.

FIG. 2 is a flowchart of an exemplary method according to the present invention for converting the data into the internal format for publication. In a first part of the method, various structures of the newspaper page are recognized, preferably first by performing the recognition process for each page separately. In step 1, the step of analyzing text and/or graphic elements on the current newspaper page is performed. This analysis is especially important for digital (postscript sources), which may contain non-standard fonts and multi layer overlapped images. Preferably, this step of analysis includes the steps of preparing a list of text and graphic elements with properties for each element. Next, the visibility and overlapping characteristics for each graphic element are determined. Next, connected lines are located and frames are recognized. Texts with special shadowing effects and/or other special text effects are then preferably located, as are texts which are not visible on the printed page. More preferably, font analysis is then performed in order to understand special symbols (developed as fonts) and non standard ASCII coding of text.

In step 2, text segments are determined. A text segment is a text line or portion of line which lies inside one column of the newspaper page. Preferably, the attributes of the text segments are also determined by using style sheets or layout guidelines.

In step 3, text blocks are built. Each text block consists of a set of aligned text segments with the same or similar styles.

Next, in step 4, the graphic blocks are determined from the graphic elements. Each graphic block consists of a set of graphical elements, which are in a single rectangular area.

In step 5, preferably a tree of graphic blocks is created, such that each child block is nested inside the corresponding parent block.

In the next portion of the process, the different types of blocks are integrated. In step 6, the text blocks are distributed among graphic blocks.

In step 7, a tree of areas within the layout structure is created as an aggregate of graphic and text blocks which lie within the same area of the layout. Each area preferably has a main graphic block and three arrays: text blocks, graphic blocks and areas.

As an example, a graphic chart may contain a frame, axis lines, chart paths and text near the graphed data and the axes. In this example, the frame is the main graphic block. The paths of the chart and axes are elements of the graph array, while the text elements are elements of text array. If this chart contains a framed "subchart", this subchart becomes an element of the area array.

In step 8, a hierarchical net is created from these different areas. The net is a graph of the areas, which are then connected by edges which represent the relative location of the areas.

In a further part of the process, the areas are additionally collected into entities. In step 9, the graphic blocks are further processed for separation into vertical and horizontal lines. The horizontal and vertical lines in the newspaper layout play an important role as separators between entities (articles). A portion of these lines is actually curves which contain both some vertical and some horizontal elements. This step requires these curves to be separated into horizontal and vertical lines.

In step 10, optionally and preferably, lines are qualified as separated and decorated ambiguities are resolved. For example, certain horizontal and vertical lines act as text decoration, rather than separating articles. Examples of such lines include, but are not limited to, text underscoring lines, a pair of parallel lines which may be used to decorate a byline, and so forth. This step preferably uses fuzzy logic algorithms to detect decoration lines.

In step 11, separate articles of the newspaper, or other units of information, are preferably extracted to form each entity. Each entity consists of a set of blocks which represents article, ad, single photo or data. In step 12, net relations beyond and on the left of titles are removed. In step 13, net relations on the right side of titles are removed in special cases.

Steps 11-13 are preferably used to differentiate entities. In step 11, the net is cut along separation lines, such that the net is now divided into a few separate, unconnected, parts. After that each separate part is tested. If some part contains only one entity, steps 12 and 13 are not performed for this part. Instead, the algorithm passes directly to step 14 for recognition of the internal structure of the entity. If some part of the net contains a plurality of entities, it is cut beyond, and to the left of, titles in step 12. If after step 12, a part of the net is determined to contain a plurality of entities, such a part is passed to step 13 for cutting on the right side of the title.

In step 14, optionally and preferably, various types of specific units of data are recognized, including continuations; pictures and other graphic images; and captions.

In step 15, entities are created from areas. The reading order is then preferably determined for each entity element. In step 16, any additional ambiguities are preferably resolved.

In a further preferred stage of this method, post processing is performed for all newspaper pages. In step 17, links are created between entities. In step 18, the data is output to the XML format.

According to an optional but preferred embodiment of the present invention, as described with regard to FIGS. 4-7 below, each object or block is preferably categorized into one of a plurality of categories, after which each object in a particular category is preferably converted into an image format, such that preferably objects in each category are converted into a different image format. The categories preferably include at least image and text categories.

Figure 3:
FIG. 3 shows an exemplary basic layout of a newspaper page after being processed by the method of the present invention.

FIG. 3 shows a portion of an exemplary newspaper page which has been processed according to the method of the present invention. As shown, a newspaper page 30 features a plurality of objects, which are illustrative, non-limiting examples of some of the different types of objects recognized by the previously described process. As shown, newspaper page 30 features an advertisement 32, an image 34 and a title 36 for an article. For the article itself, there is shown a plurality of body objects 38. Each body object 38 contains text for the article, arranged in columns as shown.

According to another embodiment of the present invention, compression may optionally be improved by increasing the efficiency of compressing images of the actual pages. This exemplary method is preferably performed by separating at least text and images from a page of a document, and then compressing each of text and images according to a different compression format for a different image format. These separate images of portions of the page may then optionally be recombined for display. As noted in greater detail below, within the category of "text" or "graphics", subcategories may optionally be used for further selectively compression portions of a page of a document according to different compression methods for different image formats.

It should be noted that according to preferred embodiments of the present invention, the different categories are preferably not limited to a particular type of object or content that is located on a page, but rather are related to the digital parameters of the corresponding data which determines the appearance of the object. Optionally and preferably each page, or a part of a page (such as a object for example) may be represented as layers. For example, an advertisement may optionally be represented by 3 layers which lie in some z-order: raster graphics, vectors and text. The term "z-order" refers to the order in which the layers are again reassembled in order to at least display the image of the page. As a non-limiting example, the operation of the present invention with regard to z-order may be optionally performed by using a mark-up language such as HTML for example. By using this language, a plurality of images may optionally be placed at the same location, according to the same x-y coordinates, on a Web page. The order in which the images are to be placed at these coordinates is determined according to the special HTML parameter known as the "z-index", which is a non-limiting illustrative example of the "z-order" of the present invention. These z-ordered layers may optionally be separated, and then preferably compressed according to different compression methods.

This embodiment of the present invention is optionally and preferably performed with pages already in a digital format, such as a word processing format for example, or alternatively according to a format determined by another type of software application(s), such as publishing software applications, with which the separation of texts and vector graphics may be more easily achieved.

Figure 4:
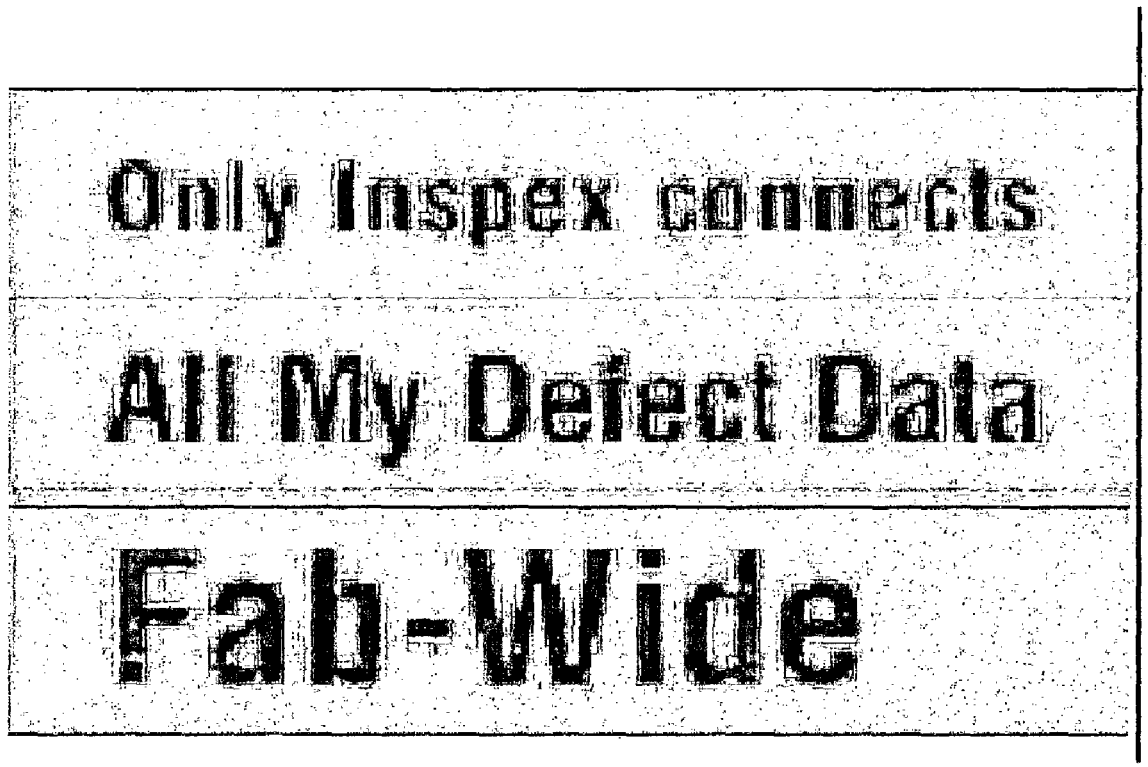
FIG. 4 shows several exemplary images of text being compressed according to the JPEG compression method.

Typically, the content features one or more original pages, which may have a complex layout structure, often with one or more areas of text, interlaced with images and graphics. In order for bitmap images obtained from such pages to be readable, for example on a typical computer monitor screen, the images preferably feature 100-200 DPI (dots per inch) resolution. These images may include millions of pixels, such that the uncompressed images of the pages may require dozens of megabytes of storage. Downloading such images to a computer for display may also require a significant period of time. Therefore, compression is preferably performed in order to provide such images of the original content. Optionally and more preferably, compression(s) are selected in order to be able to provide these images for display by a Web browser and/or through Web servers, and/or for transmission according to any suitable protocol such as HTTP for example. Current Web browsers support limited set of compression formats, such as GIF, JPEG, and PNG for example. These formats give good compression ratio, but may not be suitable for displaying original content, particularly documents in page form, which combine text and images in a rich layout. For example, the JPEG format is highly suitable for photographs with hundreds of different color tones, but texts suffer from a lack of visual sharpness, resulting in degraded visual quality for images of texts in the JPEG format. FIG. 4 shows an example of such degraded visual quality for images of texts in the JPEG format.

Achieving the appropriate quality of images of text with the JPEG format requires a very low lossy factor to be used, such that a high quality is maintained, thereby increasing image size dramatically. Unlike GIF and PNG, JPEG is a lossy format. The sharpness of images of texts having smaller fonts after JPEG compression may be severely reduced, thereby rendering the text in the image difficult to read or even unreadable.

On the other hand, the GIF/PNG formats both give good results for the compression of images of texts, usually with more legible or readable results. Moreover, if a page of a document contains only text, the image produced from such a page often does not require the same number of different colors as an image produced from a page that also contains graphics, photographs and/or other images. Reducing the number of colors that are used, for example to from about 8 to about 16 colors, still provides good, clear representation of the text in the image of the page, and also yields a high compression ratio. Thus, high quality results and high compression ratio may be achieved for both of the PNG and GIF formats, for images of pages of text. For images of pages of content also containing graphics, photographs and/or other images, representation with either of the GIF or PNG formats requires the full spectrum of color usage, for example 256 colors, which may provide even worse results in terms of compression efficiency than the use of JPEG. Thus, no one image format provides suitable compression efficiency and clarity of results for an image of a page from a document, in which text and graphics, photographs and/or other images may be combined.

Figure 5B:
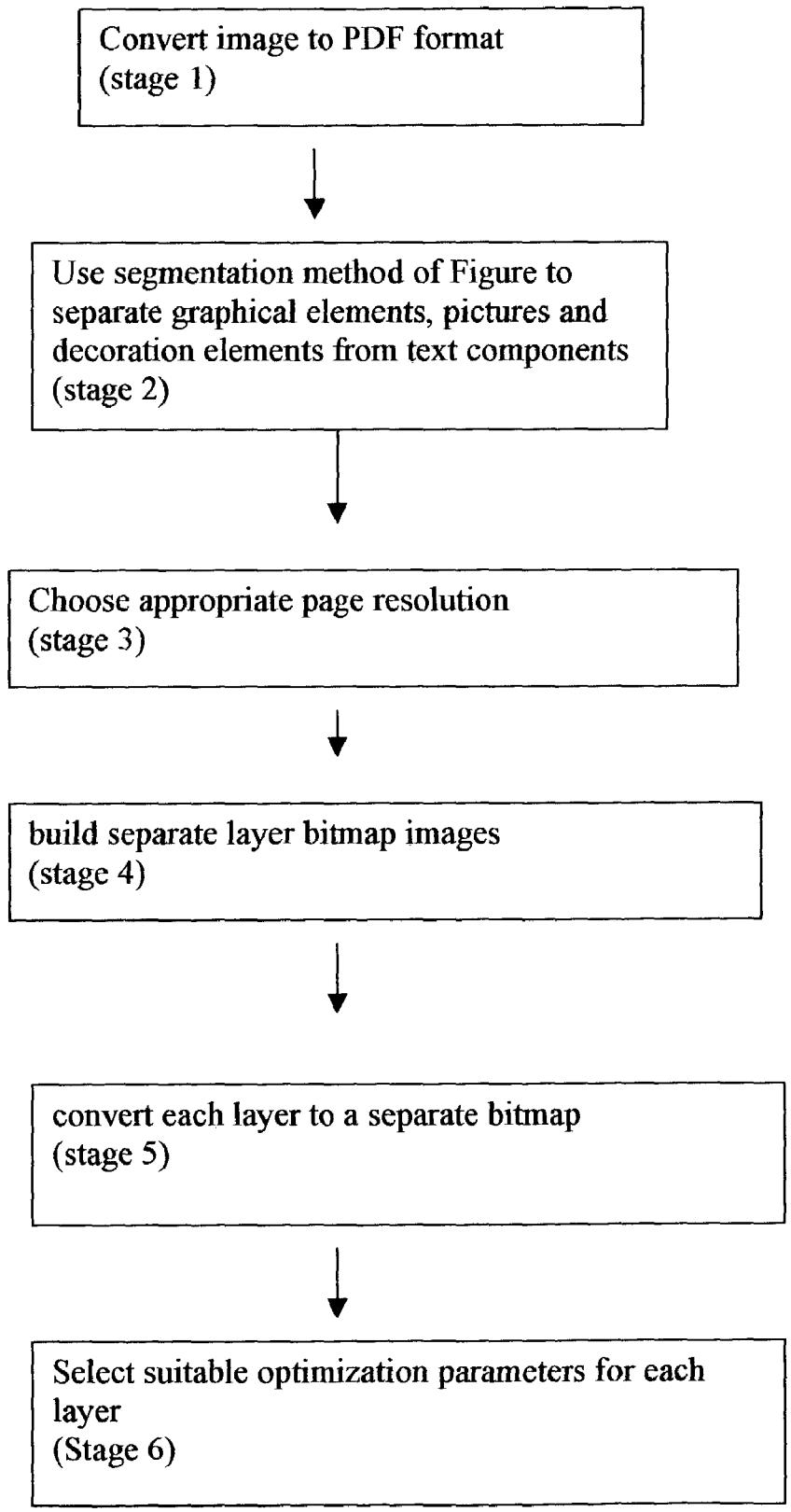

As shown with regard to the flow charts in FIGS. 5A and 5B, an optional but preferred embodiment of a method according to the present invention is able to solve this problem. Briefly, text, vector graphic and photographic images presented on the same page of a document are preferably separated into separate layers. These layers are then preferably placed in a different z-order one on top of another, which determines the structure of the flat image of the page (which is two-dimensional) as a plurality of layers arranged in an order, which is three-dimensional. The order of these layers is the "z-order", as previously described. A transparent background is then preferably added to each separate image, so that when one or more, but preferably all, of these images are combined for display, the presence of the different layers is not shown in the display. If all layers are displayed, this combination of different layers results in representation of the original page image during the display.

FIG. 5A shows a preferred implementation of the method according to the present invention for pages of a digitally available document (as opposed to a scanned paper or other physically available document format, described with regard to FIG. 5B below). In stage 1, the digital document is preferably convertible into some interconvertible format, such as the PDF format of Adobe Inc for example. Many if not all digital formats for documents may be converted into PDF, although it should be noted that this is a non-limiting example of an interconvertible format, which is preferably any digital format into which a document may be converted from more than one type of document format, such as Microsoft Word, PowerPoint, and AutoCAD as non-limiting, illustrative examples.

In stage 2, optionally and preferably an appropriate page resolution is selected to represent the page, which enables the PDF page to be converted into an image, for example for display by a Web browser. The resolution (optionally measured in DPI—dots per inch) defines the target image size. In stage 3, optionally and preferably the PDF Application Programming interface is used to separate images, vector graphic and texts into different bitmap images. For example, a request may optionally be sent to the API of Adobe™ Acrobat to perform an image capture process. Image capture may optionally, alternatively or additionally, be performed by any suitable software program that renders data for the display, and is not necessarily performed by a special or dedicated software program. More preferably, the API of the relevant program is used to send instructions and/or commands to the rendering program, with regard to of the portion of the image to be displayed, such as a text only display for example, and with regard to the resolution of the display. As part of this process, the API is optionally and preferably requested to only show vector graphics, for example, after which image capture may optionally be performed. Next, the API may optionally be requested to only show text, after which image capture may optionally be performed again.

Figure 6:
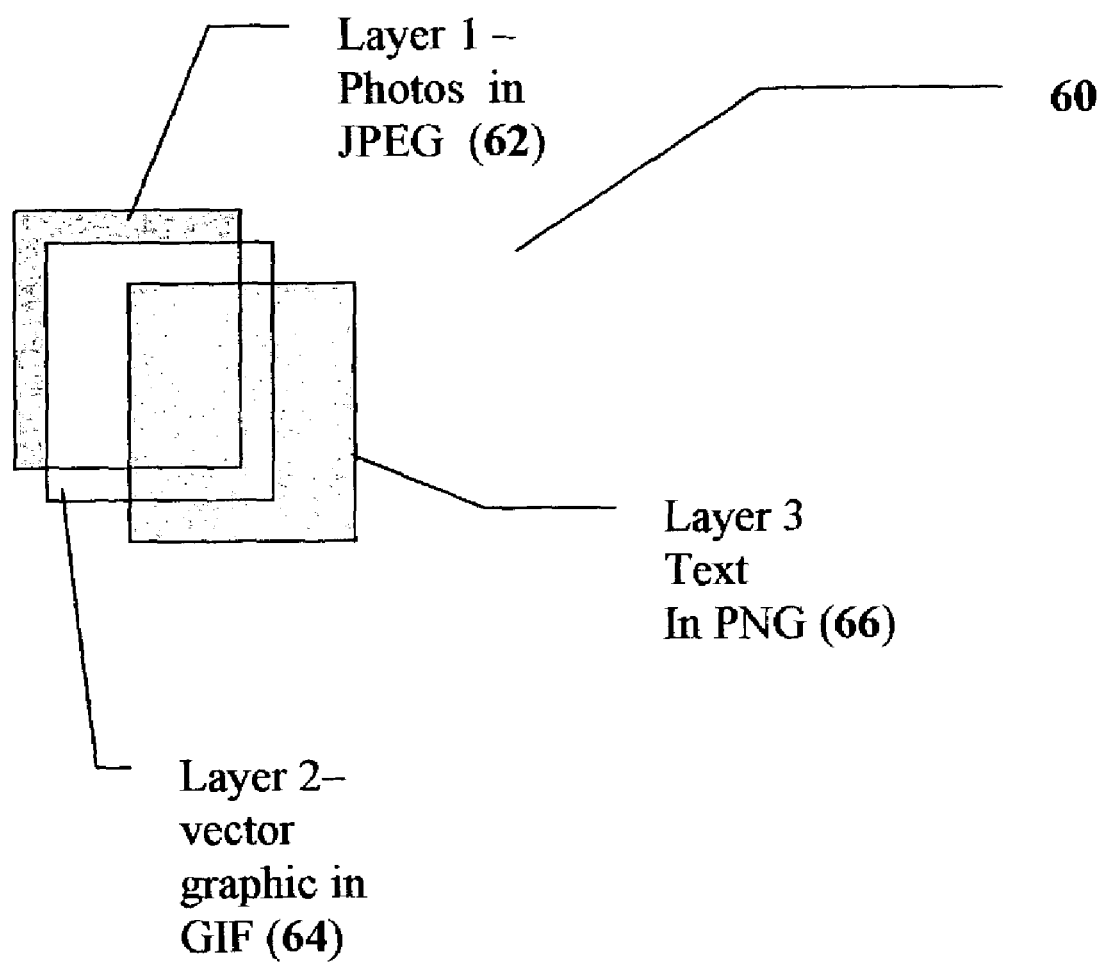
FIG. 6 shows a schematic block diagram of a page decomposed into layers according to the present invention.

In stage 4, different compression formats are preferably used to at least convert, and more preferably to store, the different bitmap layers from the document page (see also FIG. 6 for a description). The different compression formats are optionally and preferably chosen according to the characteristics of the data to be compressed. For example, the JPEG compression format is suitable for compression of images with many different colors, such that the area for each color is relatively small, although a trade-off may occur with regard to sharpness or clarity. The GIF and/or PNG formats are suitable to preserve sharpness, as they are not lossy, but they are less suitable for images with a large number of colors. Thus, optionally and preferably, JPEG is used for photographs, while PNG and/or GIF may be used for text and vector graphics. Of course, it is understood that these formats are given as examples only, as other format(s) may optionally be selected according to the characteristics of the data to be compressed.

In stage 5, suitable optimisation parameters are optionally and preferably chosen for each layer. Some non-limiting examples of typical parameters include the following parameters for the following illustrative bitmap layers: for layers taken from raster images, the JPEG format is preferably selected with a loss factor more preferably in a range of from about 80% to about 85% loss factor and zone optimizing may be used as well; for layers taken from text, the PNG and/or GIF format is preferably used, more preferably with the palette optimized to from about 6 to about 8 colors; for layers taken from vector graphics, the PNG and/or GIF format is preferably used, more preferably with the palette optimized to from about 2 to about 4 colors.

FIG. 5B shows an optional but preferred implementation of the method according to the present invention for scanned documents (scanned from different media), such as documents rendered into an electronically storable and/or optical form from a physical format, such as paper or microfilm for example. In stage 1, the image is preferably converted to PDF format.

In stage 2, the segmentation method of FIG. 2 is optionally and preferably used to separate graphical elements, pictures and decoration elements like vertical lines, frames and so forth, from text components. For scanned images, however, only pixels are provided, without definition of such elements. Therefore, segmentation is preferably performed to define areas where various elements are located, including but not limited to, text, pictures and lines. Once these areas of pixels have been defined, preferably these different areas of pixels are used to define the appropriate layers, as described in greater detail below.

In stage 3, the appropriate page resolution is preferably chosen as for FIG. 5A above. In stage 4, information from the segmentation process of stage 2 is preferably used to build separate layer bitmap images. Once these areas of pixels have been defined, preferably these different areas of pixels are used to define the appropriate layers, such that the process of layer creation is preferably different. For example, for digital images, the API and/or other interface to a software program may optionally be used to show text, vector graphics, and/or pictures separately, and then to "grab" the image for each layer. In contrast, for the process of FIG. 5B, preferably segmentation defines the regions which are then preferably placed in the appropriate layer.

In stage 5, a plurality of different compression formats is preferably used for converting each layer to a separate bitmap, for storage and/or display of the layers. In stage 6, suitable optimisation parameters are preferably selected for each layer as for FIG. 5A above.

Among the advantages of this exemplary method according to the present invention is the provision of better compression for the separated components than for an image of an entire page of a document, typically at least about 3-4 times greater, with high quality readability of text components. The method may also optionally be implemented with standard Web browsers. Unlike other attempts at providing better compression of images for downloading from Web servers according to the background art, no additional applet/plug-in installation is required. Also, the method according to the present invention enables separate compression parameters and quality factors to be determined for different parts of image, such as for text components as opposed to vector graphics for example, as previously described. Thus, a greater amount of flexibility is possible for criteria of quality and/or size.

FIG. 6 shows a schematic layout of a page of a document, with the different components separated into different layers. As shown, a page 60 has different components, shown as a photographic layer 62, a vector graphic layer 64 and a text layer 66. The term "layer" is used to refer to the optional but preferred implementation in which the different components are preferably recombined for display, and/or for storage, into a single visual representation. This visual representation is composed of the layers, which feature each of the components of page 60 in the same or at least a highly similar layout form, more preferably with a transparent background. The transparent background allows two or more of photographic layer 62, vector graphic layer 64 and text layer 66 to be recombined without the presence of the different layers being visible in the resultant display.

FIG. 6 also shows an optional but preferred implementation of the method according to the present invention, in which components of page 60 in the category of images are preferably divided into subcategories, shown here as photographs and vector graphics. The components in each of the subcategories are preferably compressed according to different compression methods in different image formats, shown herein as JPEG for photographs in photographic layer 62, and GIF for vector graphics in vector graphic layer 64. Text is optionally and preferably compressed according to PNG as shown for text layer 66.

Figure 7A:
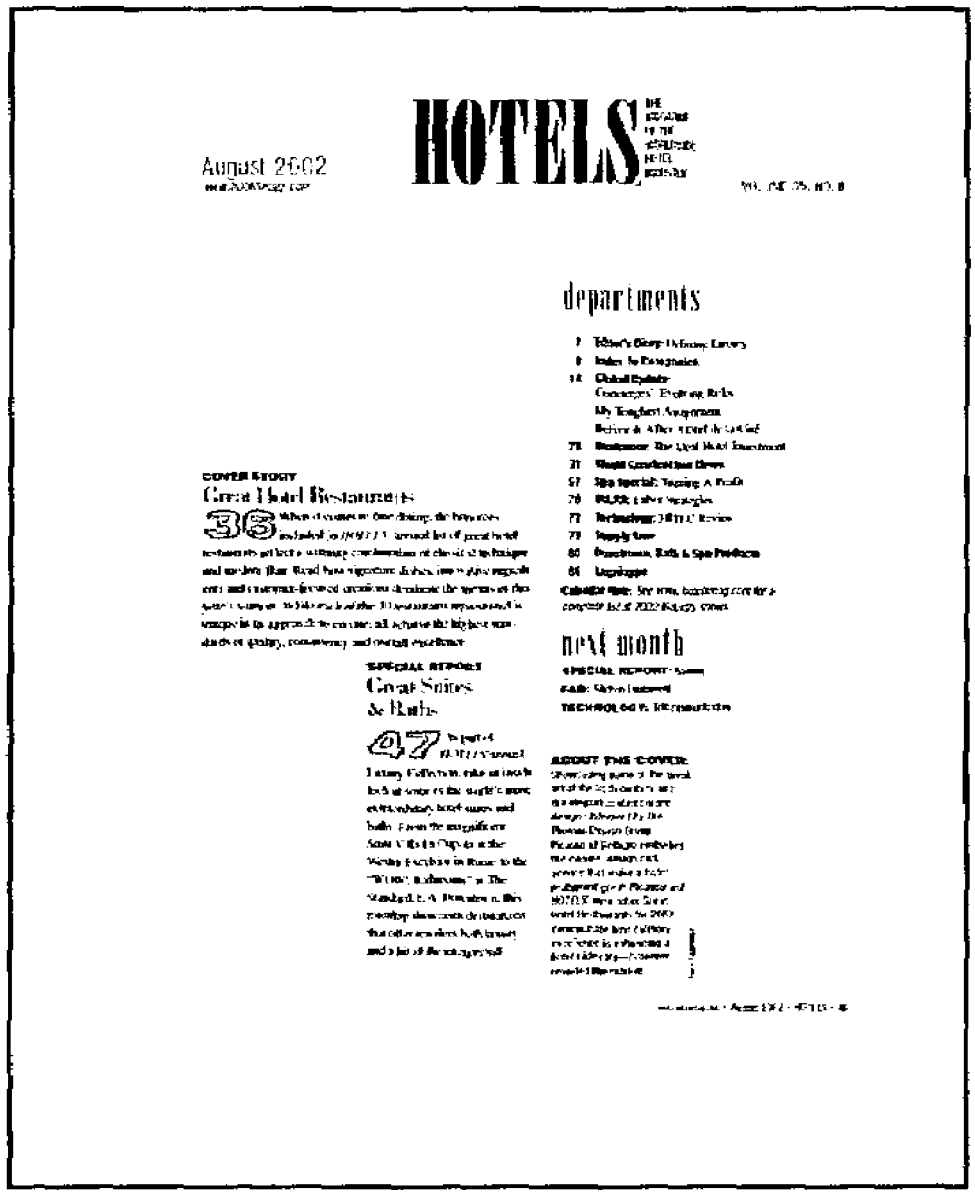
Figure 7B:
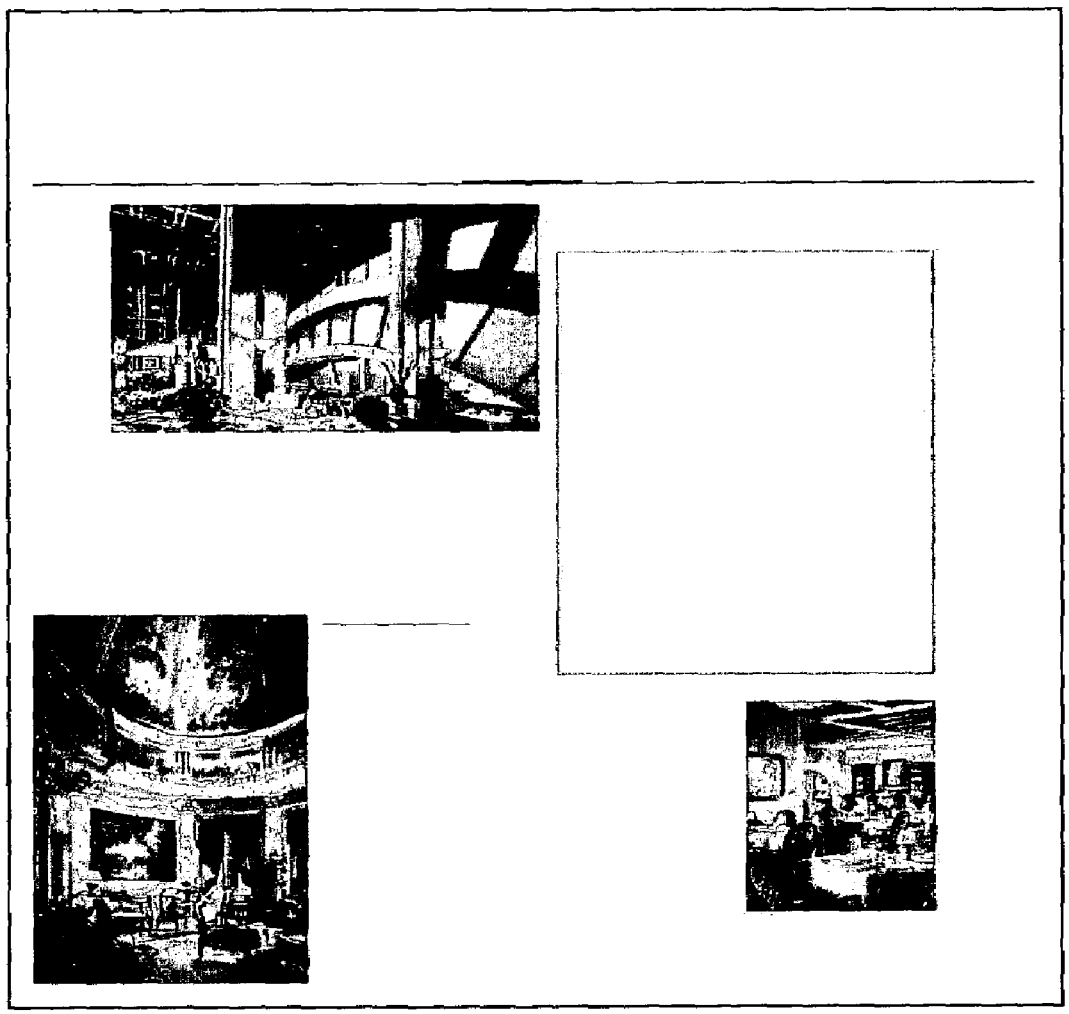

FIGS. 7A-7C show the results of performing the method according to the present invention on an exemplary page of a document. As shown, the exemplary page optionally features text (FIG. 7A) and vector graphics together with photographs (FIG. 7B). FIGS. 7A and 7B show the page already decomposed into 2 layers, with the text and graphics arranged according to the same or at least a highly similar layout structure as the original page. Each layer features components arranged on a transparent background as shown, according to a preferred aspect of the method according to the present invention.

FIG. 7C shows the layers of FIGS. 7A and 7B recombined for display as a single image (although preferably each layer is maintained as a separate image, for example for storage). The transparent background of each layer enables the resultant combined set of displayed layers to appear to be a single image, such that the presence of the different layers is preferably not visible to the user when displayed.

While the invention has been described with respect to a limited number of embodiments, it will be appreciated that many variations, modifications and other applications of the invention may be made.

What is claimed is:

1. A method for efficiently compressing an electronic image representing a page of an existing document, the page comprising text and graphics portions integrated together in a page structure, the method comprising:

analyzing said page structure;

automatically separating the page of the existing document in the electronic image into a text layer, and a raster graphics layer, and a vector graphics layer, all of said layers being logical layers in a first electronic image format;

compressing said text logical layer, said raster graphics logical layer and said vector graphics logical layer into a first, second and third compressed image formats respectively, wherein said first compressed image format utilizes a first image compression method optimized for text, said second compressed image format utilizes a second image compression method optimized for raster graphics, said third compressed image format utilizes a third image compression method optimized for vector graphics;

selecting the compressed image format for each logical layer to provide respectively more efficient compression therefor;

decompressing said compressed text logical layer, said compressed raster graphics logical layer and said compressed vector graphics logical layer in accordance with said first, second and third image compression methods respectively; and displaying, through a Web browser, the electronic image of the page by combining said decompressed text logical layer, said decompressed raster graphics logical layer and said decompressed vector graphics logical layer for display, said combining being to reproduce said analyzed page structure from said logical layers, wherein said separating at least said text, said raster graphics, and said vector graphics portions from the page further comprises converting the page to an interconvertible format, such that said layers are separated according to said interconvertible format.

2. The method of claim 1, wherein said raster graphics layer comprises a photographic image layer.

3. The method of claim 1, wherein an appropriate page resolution is selected for the page.

4. The method of claim 1, wherein at least one optimization parameter is selected for each layer for performing said compression method.

5. The method of claim 1, wherein the document comprises a digital document, such that the page is converted to said interconvertible format without requiring scanning.

6. The method of claim 1, wherein the document comprises a document in a physical format, such that the page is converted to said interconvertible format by scanning the page to form a digital document, and then converting said digital document to said interconvertible format.

7. The method of claim 6, wherein said separating at least images of text, raster graphics, and vector graphics segmenting a plurality of areas on the page according to vector graphics, raster graphics or textual components.

8. The method of claim 7, wherein information from said segmenting is used for building said layers.

* * * * *